July 24, 1956  S. B. VALIULIS  2,755,691
WIRE STRIPPER
Filed March 27, 1952
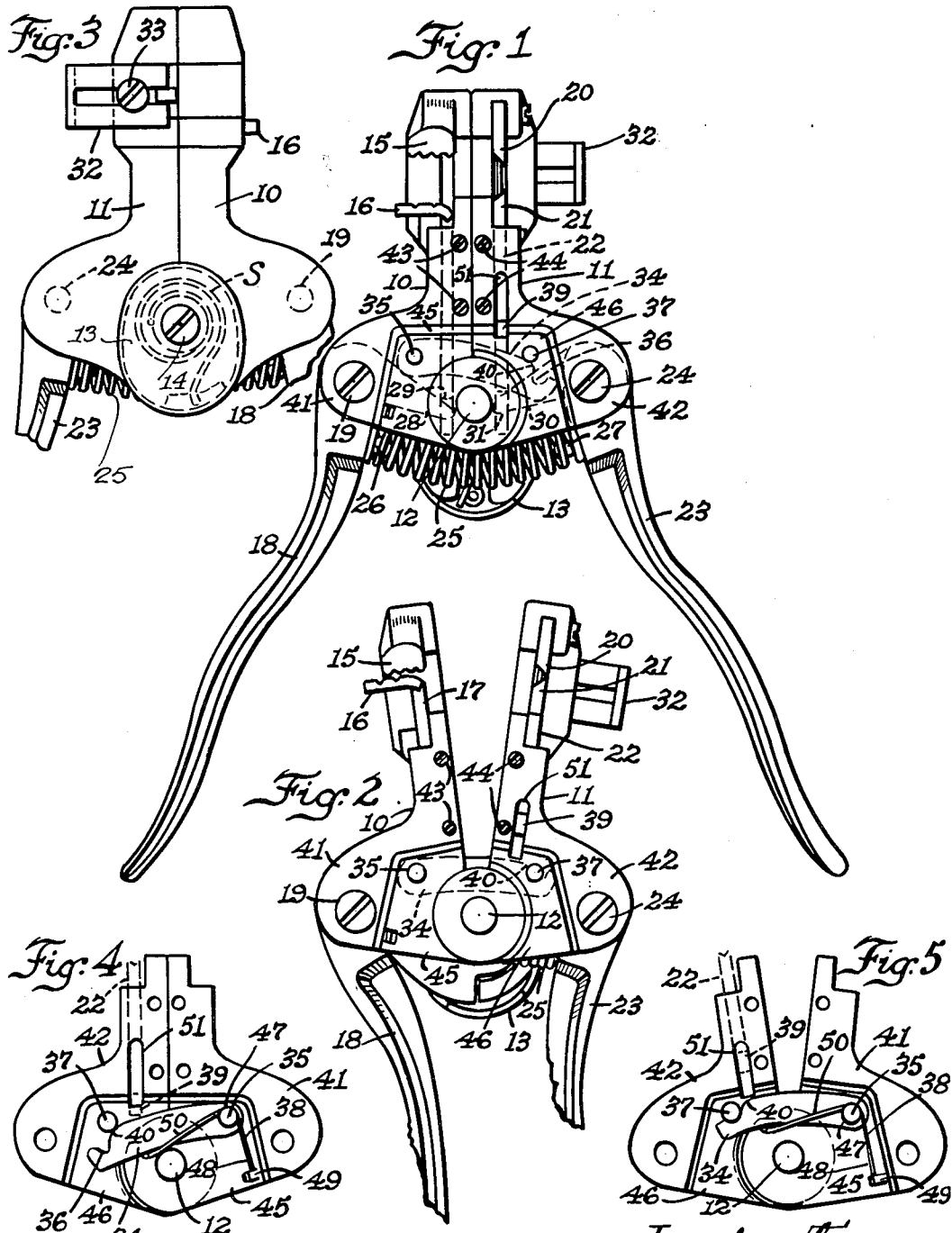
Inventor
Stanley B. Valiulis
Andrew F. Wintercorn
Atty

United States Patent Office 2,755,691
Patented July 24, 1956

2,755,691

WIRE STRIPPER

Stanley B. Valiulis, Rockford, Ill.

Application March 27, 1952, Serial No. 278,858

6 Claims. (Cl. 81—9.5)

This invention relates to an improved wire stripping tool of the general type disclosed in Wood Patent No. 2,313,793.

In wire strippers of this kind the one hinged half of the body carries one pair of jaws for clamping a wire by its insulation a given distance from the end, and the other hinged half carries a pair of blades adapted to be closed on the insulation to cut it completely around the wire and thereafter strip it off when the hinged halves of the body are moved apart. Due to the fact that at the end of this operation the wire is still held between the clamping jaws and the stripper blades it is quite apt to be crushed when the tool is allowed to close again under action of the return spring when the handles are released. It is important, therefore, that the stripper blades be permitted to separate an instant before the hinged halves of the body are allowed to close again. On the other hand, if the catch for holding the hinged halves of the body apart at the end of each wire stripping operation has to be manually released, the operation is too slow, epsecially for production jobs requiring numerous strippings. It is, therefore, the principal object of my invention to provide a catch adapted to take hold momentarily to delay just for an instant the closing of the tool after the stripping operation, the catch being released automatically so that it is not necessary for the operator to perform a separate operation to release the catch. The catch is operable to released position by the return movement of the movable wire stripper blades, thereby insuring the proper timing of its release in relation to the opening of the stripper blades.

The invention is illustrated in the accompanying drawing, in which—

Fig. 1 is a face view of a wire stripper made in accordance with my invention, the catch being indicated in dotted lines in retracted position;

Fig. 2 is a similar view of the tool, showing the catch in dotted lines in the operative position;

Fig. 3 is a rear view of a portion of Fig. 1, and

Figs. 4 and 5 are back views of the two front plates removed showing in full lines the latch, which is a part of this assembly, in the same two positions as in Figs. 1 and 2.

The same reference numerals are applied to corresponding parts in these five views.

Referring to the drawing, the wire stripper disclosed is similar to that of my copending application, Serial No. 32,940, filed June 14, 1948, now Patent No. 2,622,461, and comprises a pair of generally L-shaped body halves or carriers 10 and 11, which are hingedly connected by a rivet pin 12 at the front and by a coaxially arranged interfitting pivot pin and bearing at the back, the latter being covered by a plate 13 that is secured to the pivot pin by a screw 14. The plate 13 serves to enclose a torsion spring S disposed in concentric relation to the pivot pin and anchored at its opposite ends to the two body halves tending to close the same. The body member 10 carries the wire clamping jaws, consisting of a stationary shoe or jaw 15 and a movable shoe or jaw 16, the movable jaw 16 having a slidable bar or shank portion 17 guided in the member 10 and suitably operatively connected in the lower portion of member 10 with the lever or handle 18 that is pivoted at 19 to member 10. The body member 11, on the other hand, carries the wire stripping means or jaws, consisting of a stationary stripper jaw or blade 20 and a movable jaw or stripper blade 21, the latter having a bar or shank portion 22 suitably guided in member 11, and suitably operatively connected in the lower portion of member 11 with the other lever or handle 23 that is pivotally connected at 24 to member 11. A coiled compression spring 25 is mounted at its opposite ends on projections 26 and 27 provided on the inner sides of the handles 18 and 23, respectively, and tends normally to urge said handles apart. The construction of the tool as thus far described corresponds to what is disclosed in Wood Patent 2,313,793, and it is believed, therefore, that there is no need to go into these details more fully, beyond stating that in the operation of the tool the torsion springs under the plate 13 will serve to hold the body members 10 and 11 together, namely, in closed position, while the handles 18 and 23 are being closed part way to grip a wire between the jaws 15 and 16 and to cut through, or at least partially through, the insulation with the blades 20—21. Then, after this first stage of the operation of the tool has been completed, further closing movement of the handles 18 and 23 serves to spread the body members 10 and 11 apart, swinging the same about their common pivot 12 to the position shown in Fig. 2, in which relative movement of the body members the severed, or partially severed, end portion of the insulation is pushed off the end of the wire as the wire, gripped between the jaws 15 and 16, is pulled away from the stripper blades 20—21. The movable clamping jaw 16 is moved up and down by oscillation of handle 18, the latter having an arm 28 on its pivoted end engaging in a slot 29 provided in the lower end portion of the shank 17 of jaw 16 to provide the operating connection. In like manner, there is an arm 30 on handle 23 engaging in a slot 31 provided in the lower end portion of the shank 22 of jaw 21 to operate the movable stripper blade 21 up and down with oscillatory movement of handle 23. A slidably adjustable stop 32 is provided on the body member 11 and secured in adjusted position by a screw 33 to predetermine the length of insulation to be cut and stripped off by means of the jaws 20—21, it being obvious that if the end portion of the wire, when placed in the tool preparatory to the stripping operation, is placed with its end in abutment with the stop 32 it will have only that length of insulation stripped off measurable between the cutting edges of blades 20—21 and stop 32. Of course, if the operator purposely places the wire in the tool short of the stop 32, a shorter length of insulation will be cut and stripped off.

In accordance with my invention, an elongated stamped sheet metal catch or latch, indicated generally by the reference numeral 34 is provided, pivoted at one end, as at 35, relative to body member 10, and having a notch 36 in the other end arranged to receive a pin 37 carried on the other body member 11 to hold the tool open, at least momentarily, as shown in Fig. 2, long enough for the wire clamping jaws 15 and 16 to release the wire, so that the tool can close without bending or crushing the stripped end. The catch 34 has a torsion spring 38 connected thereto to urge its notched free end normally toward engagement with the pin 37, so that as soon as the tool is opened far enough the pin 37 will enter notch 36 to lock the tool releasably in the open position. However, the shank portion 22 of the movable stripper blade 21 has a lug 39 projecting forwardly from its lower end portion, a short distance upwardly from the slotted extremity 31, and this lug is arranged to engage the free end portion of the catch 34 from above as the tool closes under action of spring S and shank 22 moves down under action of spring 25 on handle 23, whereby to overcome spring 38 and release the catch as shown in Figs. 1 and 4 a moment after it has taken hold. The momentary holding of catch 34 is just enough to prevent bending or crushing of the stripped end of the wire because it insures the backing away of stripper blade 21 from stripper blade 20 before the tool closes. Since it is the lug 39 on shank 22 of blade 21 that does the actual releasing of catch 34 it is obvious that the timing of the release in relation to the parting of the blades 20 and 21 will always be correct in every operation of the tool. The momentum of the spring returned handle 23 and shank 22 is an important factor in the operation of the catch 34, and I may, by providing spring 38 of sufficient strength in relation to springs S and 25, provide a tool of the present design that will close only when the handles are allowed to spread quickly. In other words, if the operator by restraint on the handles 18 and 23 allows them to open slowly so that lug 39 comes to rest gently on catch 34, instead of striking it a sharp blow, as it does otherwise, the catch 34 if held by a slightly stronger spring will not be released but will remain locked on pin 37 and under action of spring 38 and it will require another and much faster closing and opening operation of the handles 18 and 23 to release the catch. There are many times when an operator prefers to delay the release of the catch, as when a special job of wire stripping is being done, and it would, therefore, be quite an advantage to be able to operate the tool in either of the two ways described. In a production job, however, where the stripping operation is identical for a large number of wires, the handles are operated alike every time and the slightly delayed closing of the tool produced by the momentary holding of the catch 34 is all that is needed. The rounding on a fairly large radius of the corner 40 on the inner side of the notch 36 makes the release of the catch 34 much easier and smoother, because as soon as the pin 37 is partway out of the notch 36 it rides on the arc 40 and the catch is forced out of the way by cam action as the tool closes under the action of its torsion closing spring S. There are two face or cover plates 41 and 42 pivotally connected together by rivet 12 and fastened to the body members 10 and 11, respectively, by screws 19 and 24, and other screws 43 and 44, and these face plates have embossed portions 45 and 46 behind and upon which the catch 34 and its supporting pin 35 and actuating spring 38, together with pin 37, are provided. The spring 38 has a coiled middle portion 47 by which it is carried on pin 35 and has one tangential end portion 48 fixed by abutment with a lug 49 struck from plate 41 while its other tangential end portion 50 is hooked onto the lower edge of catch 34 to urge it upwardly toward engagement with pin 37. A vertical slot 51 is provided in face plate 42 through which the lug 39 projects for free reciprocation of stripper blade 21 between operations of catch 34, the slot 51 terminating at the embossed portion 46 where the lug 39 is movable behind the front wall of the embossed portion to engage and move catch 34 in the manner described above.

It is believed the foregoing description conveys a good understanding of the objects and advantages of my invention. The appended claims have been drawn to cover all legitimate modifications and adaptations.

I claim:

1. A tool for stripping insulated wire comprising, in combination, a pair of elongated jaws arranged in side-by-side relation and pivoted together adjacent one end, wire clamping means on one jaw including a stationary shoe, a bar slidably disposed in a groove extending longitudinally of the jaw and having at one end a shoe adapted to cooperate with said stationary shoe, wire stripping means on the other jaw including a stationary blade, a bar slidably disposed in a groove extending longitudinally of the other jaw and having at one end a blade adapted to cooperate with said stationary blade, a pair of hand levers pivoted respectively on said jaws, means connecting said hand levers and said bars operating when the levers are pressed together to first advance said bars and then to swing the jaws apart, means for retaining said bars in their respective grooves comprising a cover plate constructed in two sections, each secured to one of the jaws in a position to cover the groove therein, said cover sections being connected together for pivotal movement on an axis coincident with the pivotal axis of the jaws, an elongated catch pivoted at one end on one of said cover plates and having a notch provided in its other end, a pin provided on the other cover plate arranged to be entered in said notch to lock the jaws releasably in open position, spring means normally urging said catch toward locking engagement with said pin, and a lug projecting from the blade carrying bar and arranged over the catch so as to engage and move the catch to released position in a predetermined return movement of the bar after a stripping operation.

2. A tool for stripping insulated wire comprising, in combination, a pair of elongated jaws arranged in side-by-side relation and pivoted together adjacent one end, wire clamping means on one jaw including a stationary shoe, a bar slidably disposed in a groove extending longitudinally of the jaw and having at one end a shoe adapted to cooperate with said stationary shoe, wire stripping means on the other jaw including a stationary blade, a bar slidably disposed in a groove extending longitudinally of the other jaw and having at one end a blade adapted to cooperate with said stationary blade, a pair of hand levers pivoted respectively on said jaws, means connecting said hand levers and said bars operating when the levers are pressed together to first advance said bars and then to swing the jaws apart, means for retaining said bars in their respective grooves comprising a cover plate constructed in two sections, each secured to one of the jaws in a position to cover the groove therein, said cover sections being connected together for pivotal movement on an axis coincident with the pivotal axis of the jaws, and a spring-pressed catch carried on one of said cover plates and having a free end portion adapted to have locking engagement releasably with the other cover plate to lock the jaws releasably in open position, said catch being positioned in the path of movement of said blade carrying bar so as to be engaged thereby in the return movement thereof from operating position.

3. A tool for stripping insulated wire comprising, in combination, a pair of elongated jaws that are pivoted together adjacent one end, spring means normally urging said jaws to closed position, wire-clamping means on one jaw including a stationary shoe and a shoe-slide movable toward and away from the stationary shoe, wire-stripping means on the other jaw including a stationary blade and a blade-slide movable toward and away from the stationary blade, a pair of hand levers pivoted, respectively, on the pivoted ends of said jaws, means connecting said hand levers and said slides operating when the levers are pressed together to first advance said slides and then to swing the jaws apart, an elongated catch disposed transversely with respect to the pivoted ends of said jaws and pivoted at one end relative to one of said jaws and having a notch provided in its other end arranged to receive a projection provided on the other of said jaws to lock the jaws releasably in open position, and spring means normally urging said catch toward locking position, said catch being movable to released position by engagement therewith of the blade-slide in its return movement after a stripping operation.

4. A tool for stripping insulated wire comprising, in combination, a pair of elongated jaws that are pivoted together adjacent one end, spring means normally urging said jaws to closed position, wire-clamping means on one jaw including a stationary shoe and a shoe-slide movable toward and away from the stationary shoe, wire-stripping means on the other jaw including a stationary blade and a blade-slide movable toward and away from the stationary blade, a pair of hand levers pivoted, respectively, on the pivoted ends of said jaws, means connecting said hand levers and said slides operating when the levers are pressed together to first advance said slides and then to swing the jaws apart, an elongated catch disposed transversely with respect to the pivoted ends on said jaws and pivoted at one end relative to one of said jaws and having a notch provided in its other end arranged to receive a projection provided on the other of said jaws to lock the jaws releasably in open position, and spring means normally urging said catch toward locking position, said catch being movable to released position by engagement therewith of one of said slides in its return movement after a stripping operation.

5. A tool for stripping insulated wire comprising, in combination, a pair of elongated jaws that are pivoted together adjacent one end, spring means normally urging said jaws to closed position, wire-clamping means on one jaw including a stationary shoe and a shoe-slide movable toward and away from the stationary shoe, wire-stripping means on the other jaw including a stationary blade and a blade-slide movable toward and away from the stationary blade, a pair of hand levers pivoted, respectively, on the pivoted ends of said jaws on opposite sides of and in laterally spaced relation to the pivotal axis, arms projecting inwardly from the pivoted ends of said hand levers and operatively connected at their inner ends, respectively, with said slides operating when the levers are pressed together to first advance said slides and then to swing the jaws apart, spring means urging said hand levers to retracted position and serving thereby also to retract said slides, an elongated catch disposed transversely with respect to the pivoted ends of said jaws and pivoted at one end relative to one of said jaws and having a notch provided in its other end arranged to receive a projection provided on the other of said jaws to lock the jaws releasably in open position, and spring means normally urging said catch toward locking position, said catch being movable to released position by engagement therewith intermediate the ends thereof of the blade-slide in its return movement after a stripping operation.

6. A tool for stripping insulated wire comprising, in combination, a pair of elongated jaws that are pivoted together adjacent one end, spring means normally urging said jaws to closed position, wire-clamping means on one jaw including a stationary shoe and a shoe-slide movable toward and away from the stationary shoe, wire-stripping means on the other jaw including a stationary blade and a blade-slide movable toward and away from the stationary blade, a pair of hand levers pivoted, respectively, on the pivoted ends of said jaws on opposite sides of and in laterally spaced relation to the pivotal axis, arms projecting inwardly from the pivoted ends of said hand levers and operatively connected at their inner ends, respectively, with said slides operating when the levers are pressed together to first advance said slides and then to swing the jaws apart, spring means urging said hand levers to retracted position and serving thereby also to retract said slides, an elongated catch disposed transversely with respect to the pivoted ends of said jaws and pivoted at one end relative to one of said jaws and having a notch provided in its other end arranged to receive a projection provided on the other of said jaws to lock the jaws releasably in open position, and spring means normally urging said catch toward locking position, said catch being movable to released position by engagement therewith intermediate the ends thereof of one of said slides in its return movement after a stripping operation.

References Cited in the file of this patent

UNITED STATES PATENTS

| | | |
|---|---|---|
| 2,179,581 | Voogd | Nov. 14, 1939 |
| 2,313,793 | Wood | Mar. 16, 1943 |
| 2,523,936 | Axelsen | Sept. 26, 1950 |